United States Patent [19]

Noyola

[11] Patent Number: 5,899,476
[45] Date of Patent: May 4, 1999

[54] AUXILIARY FRAME WITH PROPULSION AND STEERING MEANS FOR ATTACHMENT TO WHEELCHAIR

[76] Inventor: Rufino Noyola, 3423 Deere Rd., Decatur, Ala. 35603

[21] Appl. No.: 08/986,723

[22] Filed: Dec. 8, 1997

[51] Int. Cl.⁶ ........................................... B62M 1/14
[52] U.S. Cl. ........................... 280/250.1; 280/304.1
[58] Field of Search .................. 280/250.1, 304.1, 280/237, 250, 282, 30, 7.15, 7.1; 297/DIG. 4

[56] References Cited

U.S. PATENT DOCUMENTS

| | | | |
|---|---|---|---|
| 3,381,973 | 5/1968 | Carr | 280/250.1 |
| 3,485,510 | 12/1969 | Merlan | 280/250 |
| 4,264,085 | 4/1981 | Volin | 297/DIG. 4 |
| 4,316,616 | 2/1982 | Boivin | 280/289 |
| 4,483,548 | 11/1984 | Zirrilo | 280/289 |
| 4,720,117 | 1/1988 | Hay | 280/250 |
| 5,501,480 | 3/1996 | Ordelman et al. | 280/304.1 |
| 5,533,741 | 7/1996 | Matsuo | 280/238 |

*Primary Examiner*—J. J. Swann
*Assistant Examiner*—Jim McClellan
*Attorney, Agent, or Firm*—John C. Garvin, Jr.; Harold W. Hilton

[57] ABSTRACT

An auxiliary frame having propulsion and steering devices is combined with a wheelchair to form a composite vehicle therewith. A coupling mechanism is provided to couple the auxiliary frame to a wheelchair. A steerable wheel is mounted on the wheelchair to steer and provide forward and reverse movement to the wheelchair, and, a control device is provided to permit the operator to control the direction the wheelchair is to be driven.

4 Claims, 9 Drawing Sheets

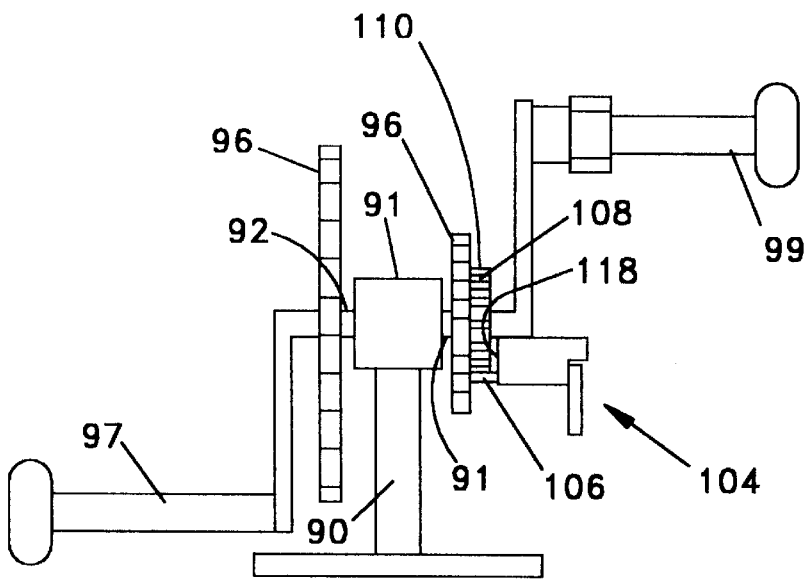
FIG. 7
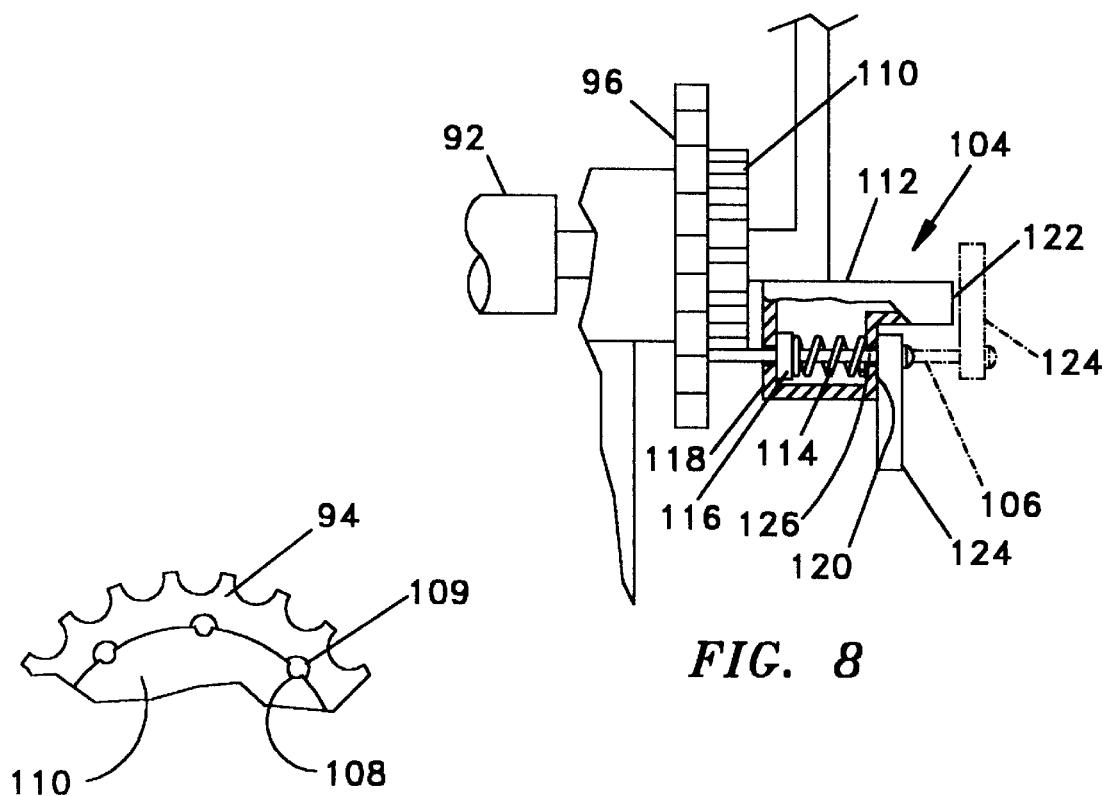
FIG. 8
FIG. 9

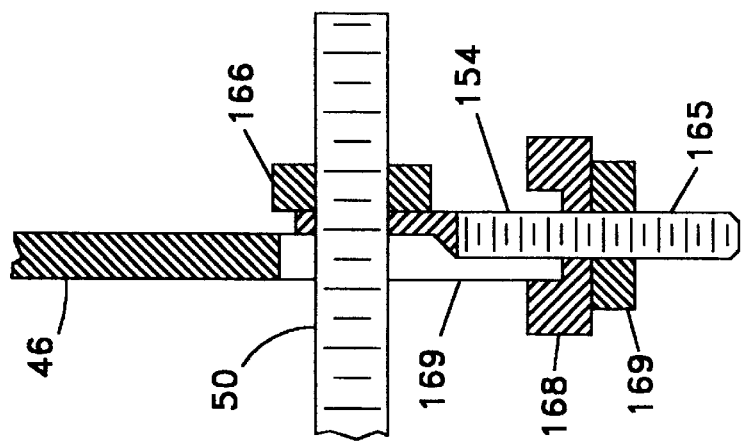
FIG. 14
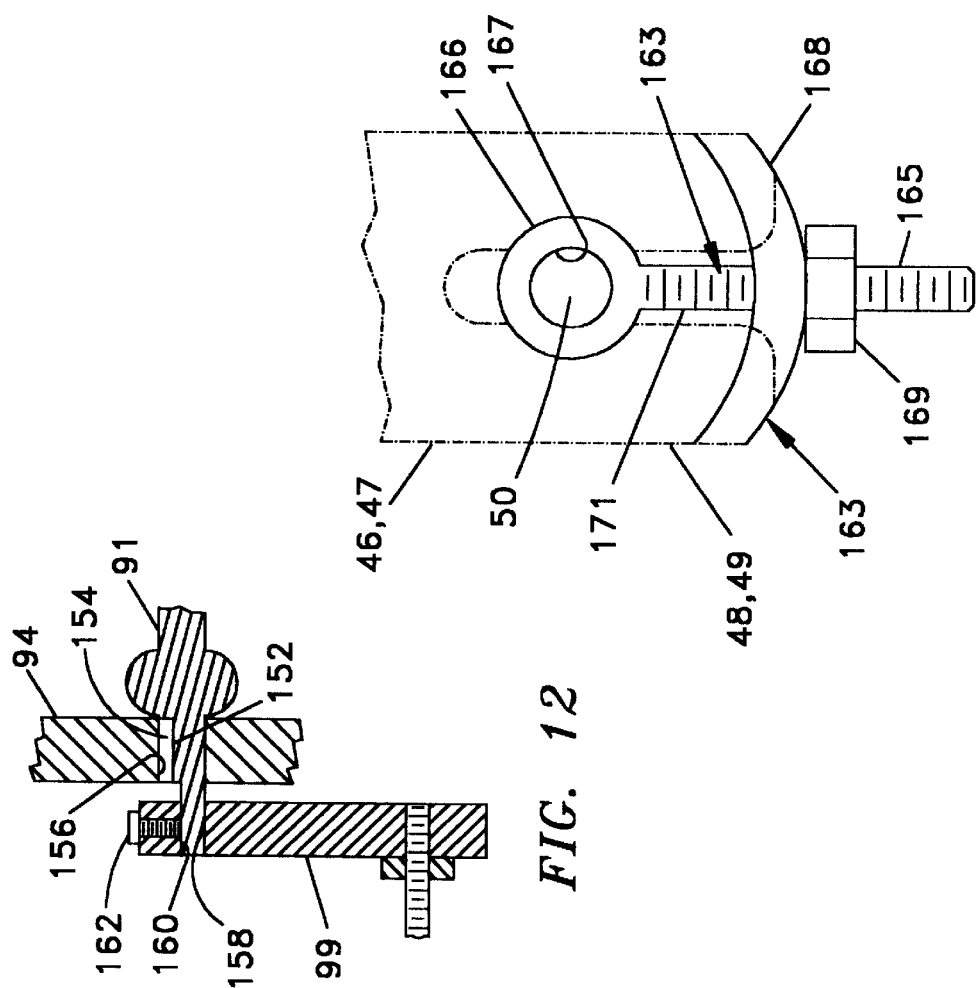
FIG. 13
FIG. 12

AUXILIARY FRAME WITH PROPULSION AND STEERING MEANS FOR ATTACHMENT TO WHEELCHAIR

FIELD OF THE INVENTION

The present invention relates generally to propulsion and steering mechanisms for conventional wheelchairs, and more particularly to an auxiliary frame for a wheelchair comprising means for coupling the auxiliary frame to the wheelchair, a wheel and drive and steering means associated with the wheel and, means for selectively permitting the propulsion and steering mechanism to move the wheelchair rearwardly and forwardly.

BACKGROUND OF THE INVENTION

For many years, the most usual vehicle or means of transportation for paraplegics and others has been the conventional wheelchair. The conventional wheelchair is a four wheel vehicle having two relatively large rear wheels and two smaller front wheels. The two front wheels are usually pivotally mounted so that the wheelchair can be turned or steered by independent rotation of the two large rear wheels. Typically, the two larger rear wheels are turned by manual manipulation, and for this purpose, an outer concentric rim is normally mounted on the wheel and the concentric rim is turned by the hand to drive and steer the wheelchair.

In recent years, there have been numerous developments which improve wheelchairs. These developments relate primarily to wheelchairs that are driven electrically by battery packs. The electrically driven wheelchairs serve their purpose and provide numerous advantages over the conventional manually manipulated wheelchairs but they also have many disadvantages or deficiencies such as the need to regularly recharge the batteries, the relatively high cost of the wheelchair, and the heavy weight of the motorized wheelchair.

There are numerous prior art devices that allow a person to propel and steer a wheelchair by means other than the manual manipulation of rims adjacent the relatively large rear wheels of the wheelchair. The following patents reflect the state of the art of which the applicant is aware insofar as they are germane or pertinent to his invention: U.S. Pat. No. 3,381,973 to Carr; U.S. Pat. No. 4,316,616 to Boivin; U.S. Pat. No. 4,471,972 to Young; U.S. Pat. No. 4,506,901 to Tosti; U.S. Pat. No. 5,312,127 to Oxford; and U.S. Pat. No. 5,501,480 to Ordelman et al.

The patent to Carr discloses a combination wheelchair and cot that includes a removable chair propelling attachment that can be either hand pedal or foot pedal operated, selectively, depending upon the preference or capabilities of the user. The patent to Boivin discloses a self-propelling and steering attachment for a wheelchair which can be installed and removed by the wheelchair user and which is power driven through a hand actuated crank mechanism through the intermediary of a multi-speed transmission whereby the user can select the right transmission ratio in accordance with the slope or type of ground on which he is travelling. The patent to Young discloses a propulsion and steering attachment for conventional wheelchairs which includes a frame, means for securing the frame to several types and sizes of conventional wheelchairs, steering and propelling means which include a hand crank and a single steerable front wheel, and means formed on the frame for allowing it to collapse for convenient storage. The patent to Tosti discloses a hand-propelled wheelchair which includes hand crank operated, chain and sprocket, direct drives to the rear, relatively large, wheels of the wheelchair to turn the rear wheels in either direction. The patent to Oxford discloses an attachment for a conventional wheelchair which allows the wheelchair occupant to propel and guide the wheelchair by reciprocating an actuating arm. The patent to Ordelman et al. discloses an attachment frame for a conventional wheelchair which includes a coupling assembly for attaching the frame to the wheelchair, at least one steerable wheel, and a hand crank for rotating the steerable wheel through chain and sprocket means for propelling the wheelchair.

SUMMARY OF THE INVENTION

It is, therefore, an object of the present invention to provide an auxiliary frame for a wheelchair which provides propulsion and steering functions for the wheelchair and which can be coupled and decoupled relative to the wheelchair in a rapid and facile manner while not requiring the condition or configuration of the wheelchair to be permanently altered.

It is a further object of the present invention to provide such an auxiliary frame with means to permit the wheelchair to be moved in reverse by the operator.

BRIEF DESCRIPTION OF THE DRAWINGS

FIG. 7 is a front view of the pair of upper drive sprocket assemblies of FIG. 6 and illustrates the sprockets as being secured to opposite ends of a sprocket supporting axle. FIG. 6 also illustrates the control mechanism for engaging and disengaging one sprocket to permit rotation of the front drive wheel in forward and reverse directions.

FIG. 8 is an enlarged view of the rear drive sprocket of FIG. 6 and illustrates the control device of figure partially in section.

FIG. 9 is a partial elevational side view of the reverse drive sprocket illustrating holes into which a rod of the control device is inserted to engage the reverse drive sprocket with the drive axle.

FIG. 12 is a sectional view of the upper sprocket and handle assembly and illustrates the manner of attachment of the handle to the axle and the sprocket to the axle.

FIG. 13 is a partial elevational view of an adjustable mechanism for adjusting the chain tension. The lower end of an elongated wheel support is shown in dot-dash lines.

FIG. 14 is a section view taken along line 14—14 of FIG. 13.

DESCRIPTION OF THE PREFERRED EMBODIMENT

Figure 1:
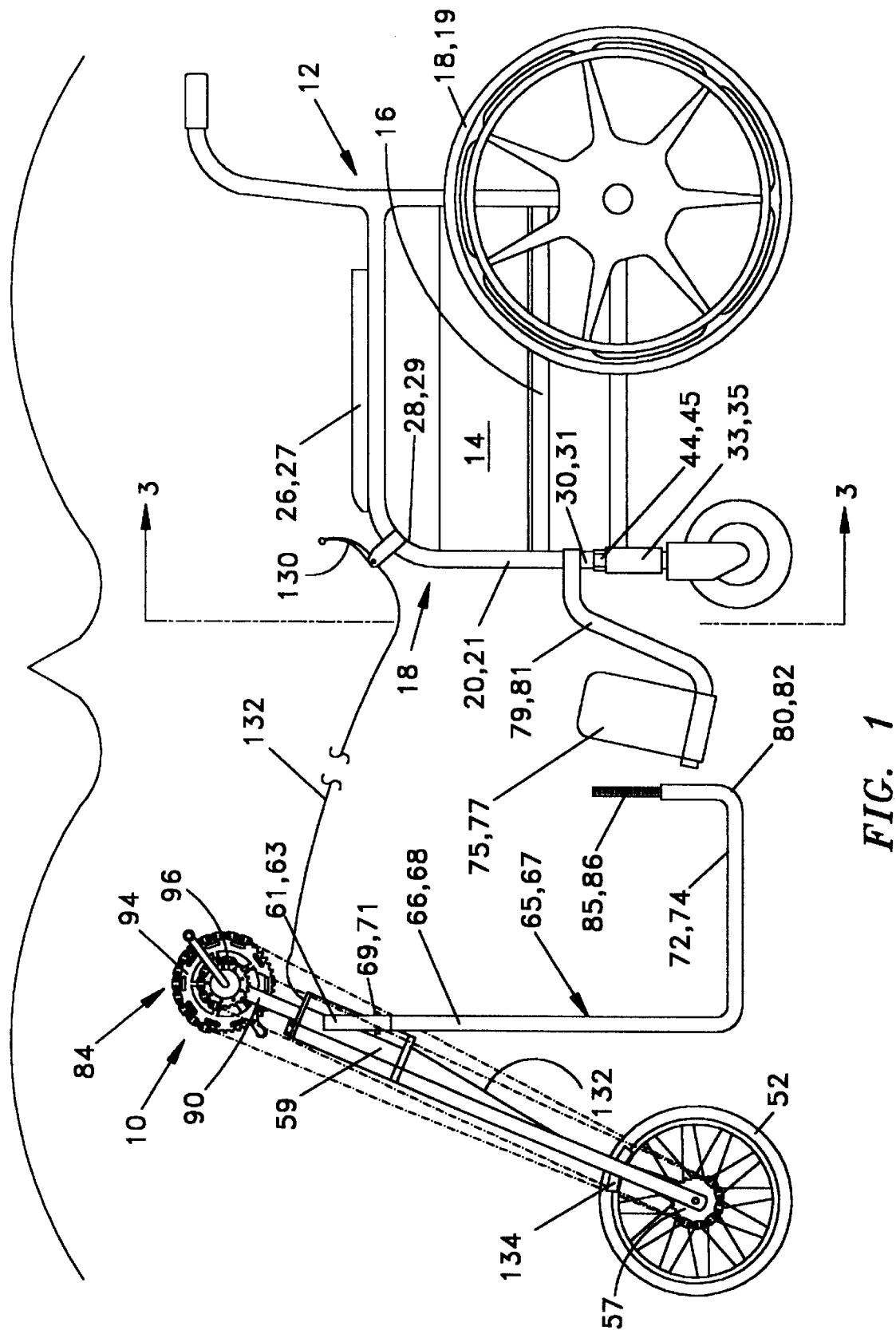
FIG. 1 is an elevational side view of the auxiliary frame of the present invention in uncoupled relation with a wheelchair.
Figure 3:
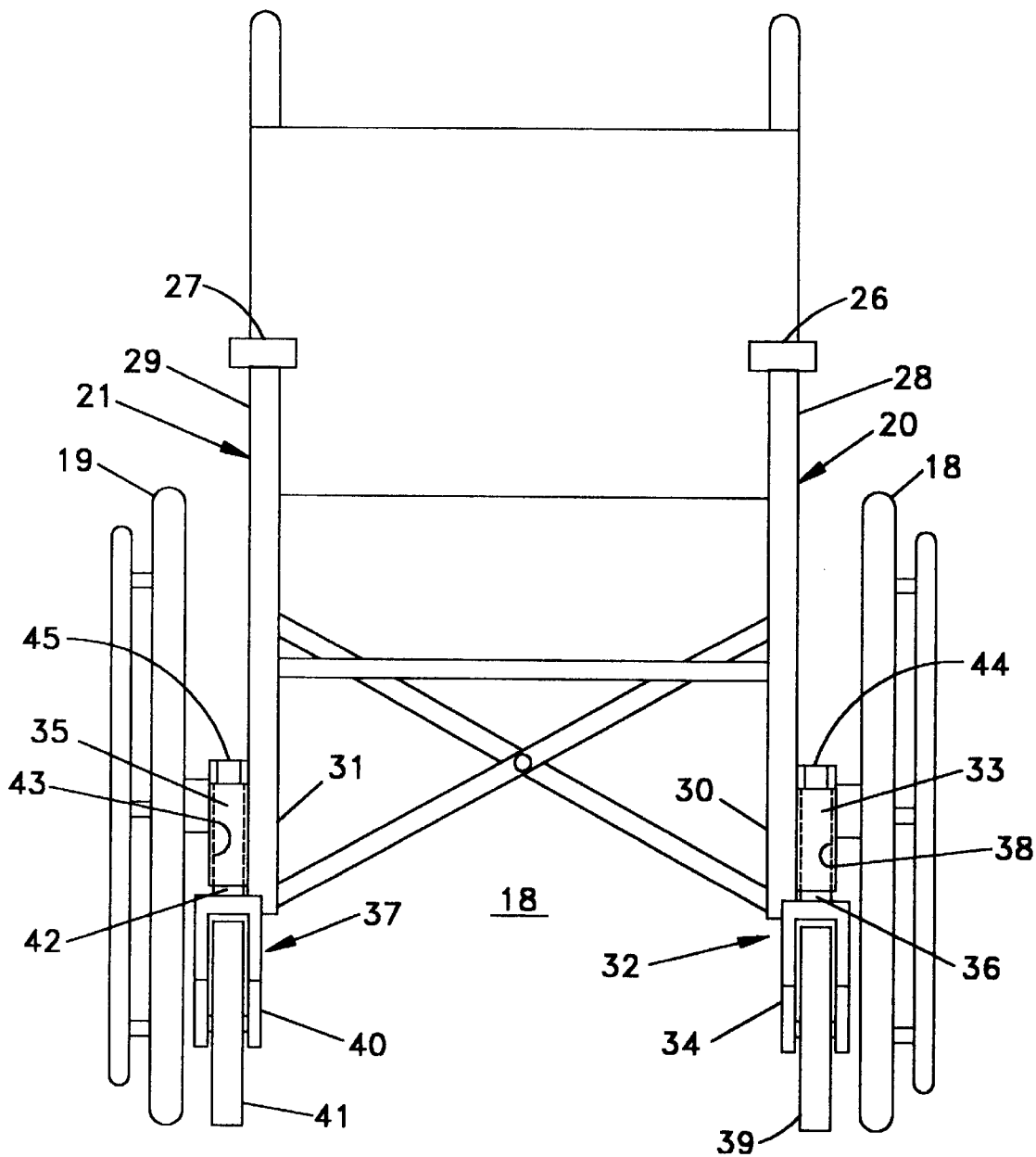
FIG. 3 is a view along line 3—3 of FIG. 1.

FIG. 1 shows an auxiliary frame 10 placed in front of a wheelchair 12 in non-coupled position. The wheelchair 12 is shown to be provided with a mainframe 14 which supports a seat 16 and a pair of rear wheels 18 and 19. Conventionally, and as more clearly seen in FIG. 3, mainframe 14 includes a forward portion 18 including a pair of vertically disposed frame members 20 and 21 having arm rests 26 and 27 at their respective upper ends 28 and 29. Frame members 20 and 21, respectively include lower portions 30 and 31 having wheel attaching members 33 and 35 for support of a pair of wheel assemblies 32 and 37 therein. Wheel assembly 32 includes a wheel support member 34 for rotatably supporting a wheel 39 therein and a threaded stub shaft 36 extending upwardly therefrom which is shown inserted into an opening 38 of wheel attaching member 33. Wheel assembly 37 includes a wheel support member 40 for rotatably supporting a wheel 41 therein and a threaded stub shaft 42 extending upwardly therefrom which is inserted into an opening 43 of wheel attaching member 35. Nuts 44 and 45 are respectively disposed on the upper ends of stub shafts 36 and 42 to secure wheel assemblies 32 and 37 to wheel attaching members 33 and 35.

Figure 5:
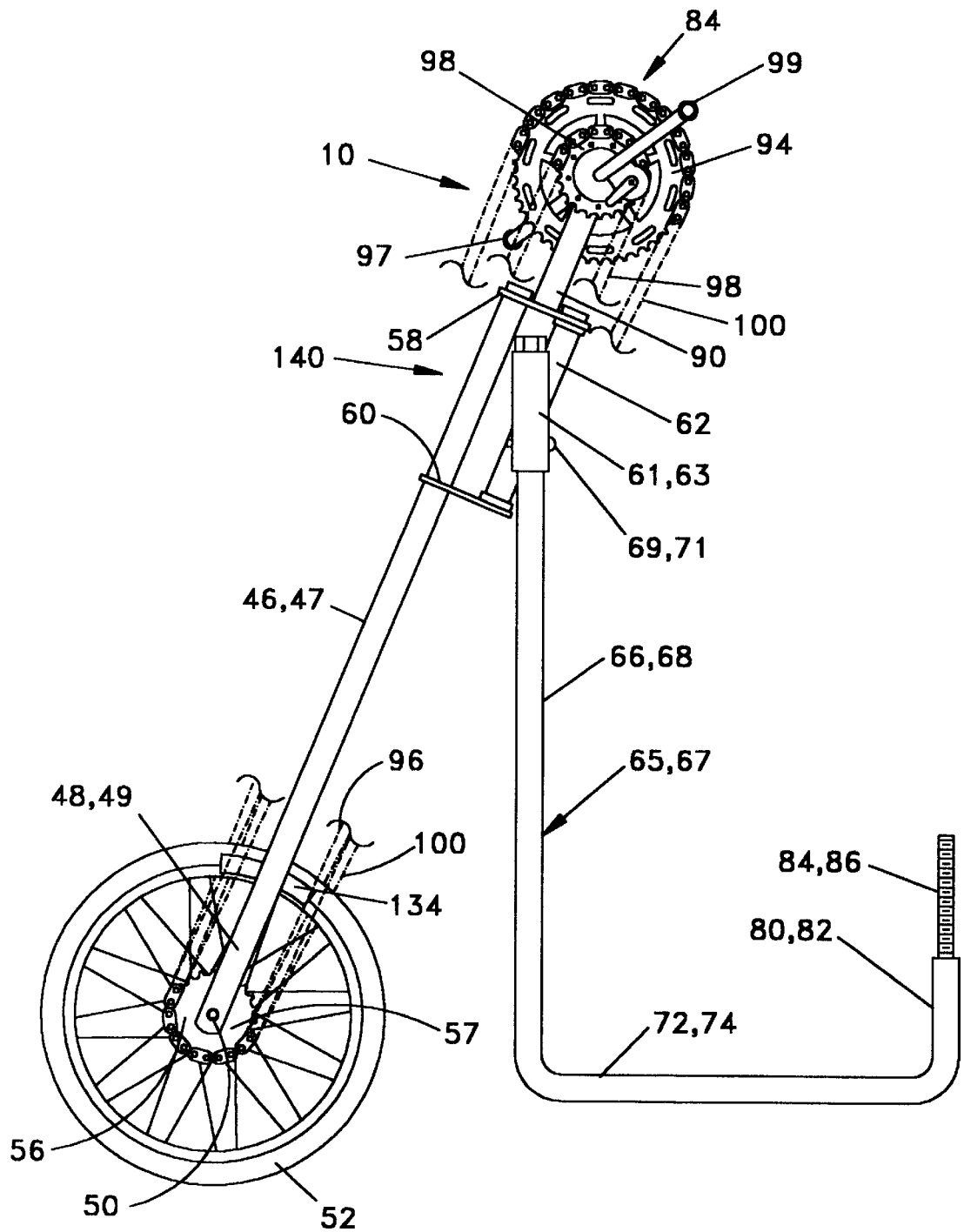
FIG. 5 is an elevational side view of the auxiliary frame of the present invention with the drive chains partially removed for clarity.

Auxiliary frame 10 (FIGS. 5 and 6) is shown to include a pair of upstanding elongated rod-like legs or wheel support members 46 and 47 connected at the bottoms 48 and 49 thereof by a lower sprocket assembly 57 including an axle 50 on which a steering wheel 52 is mounted for rotation therewith. Sprocket assembly 57 includes a pair of sprockets 54 and 56 mounted on axle 50 on opposite sides of wheel 52 to rotate wheel 52 as described hereinbelow.

Figure 10:
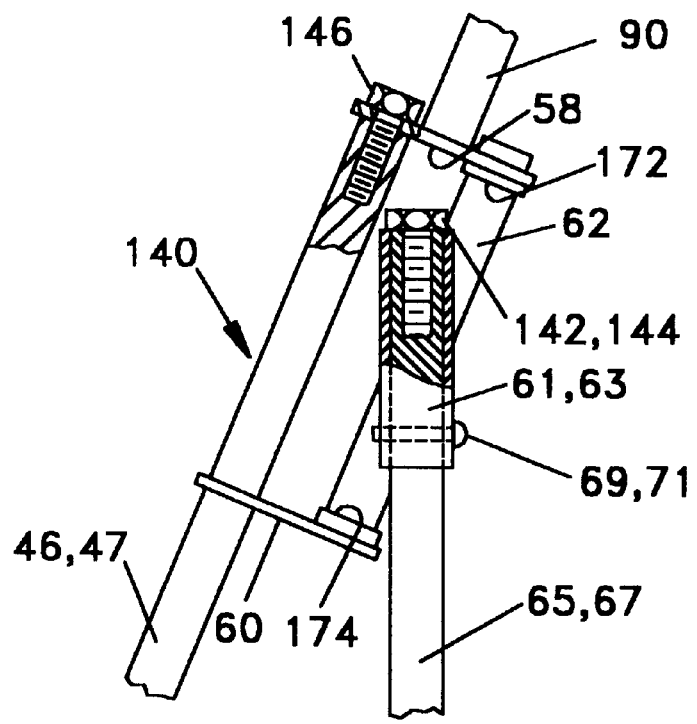
FIG. 10 is an enlarged partially sectional view of the frame assembly for joining the coupling members and elongated wheel supporting to the auxiliary frame.

Auxiliary frame 10 includes a pair of brackets 58 and 60 of a bracket assembly 140 (FIGS. 5, 6 and 10) between which a short rod-like support member 62 is connected. A pair of short tabular members 61 and 63 (FIG. 5) respectively is secured in angular relation to opposite sides of support member 62 (as by welding). A pair of coupling members 65 and 67 are provided to couple the auxiliary frame and the wheelchair. The coupling members include a pair of spaced vertical legs 66 and 68 which are respectively inserted into tubular members 61 and 63 and held therein by pins 69 and 71 and secured therein by threaded bolts 142 and 144 which are threaded into the ends of coupling members 65 and 67 as shown in FIG. 10. Coupling members 65 and 67 further respectively include a pair of horizontally extending sections 72 and 74 having a pair of upstanding connecting legs 80 and 82 disposed on the distal ends thereof. Legs 80 and 82 are provided with external threading 84 and 86.

Figure 2:
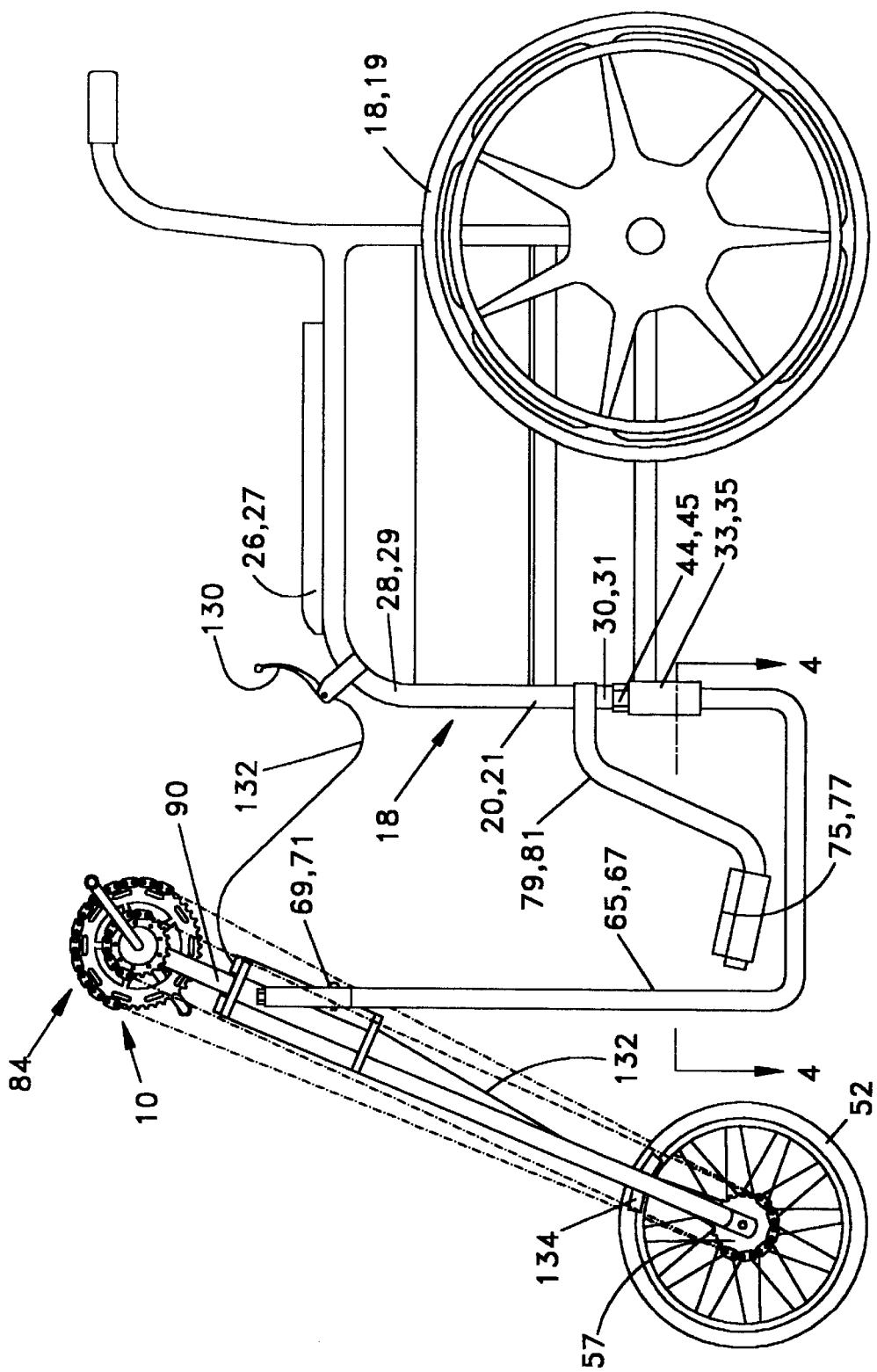
FIG. 2 is an elevational side view of a conventional wheelchair having the auxiliary frame of the present invention coupled thereto.
Figure 4:
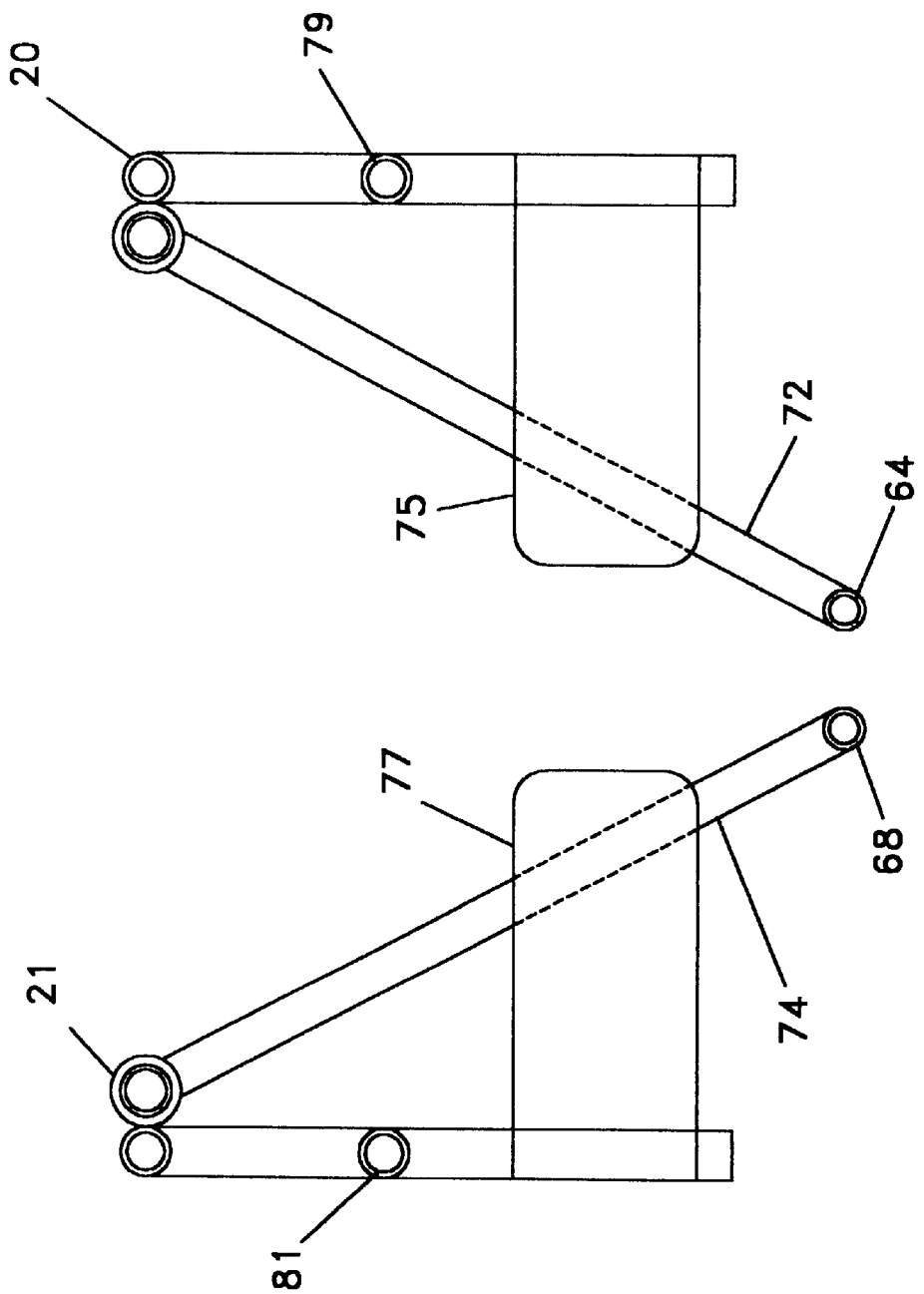
FIG. 4 is a sectional view along line 4—4 of FIG. 2.

Footrests 75 and 77 (FIG. 4) are respectively pivotally mounted to a pair of footrest support assemblies 79 and 81 (FIGS. 1, 2 and 4) and extend forwardly from frame 14 in conventional manner. As seen in FIGS. 1, 2 and 4, the footrest assemblies are in a plane above horizontally extending legs 72 and 74 of coupling members 65 and 67.

To couple auxiliary frame 10 to wheelchair 12 (as shown in FIG. 2), the front wheel assemblies 32 and 37 are removed by removing nuts 44 and 45 from the threaded stub shafts 36 and 42 of wheel support members 33 and 35 and inserting the vertical connecting members 80 and 82 of coupling members 65 and 67 into openings 38 and 43 of wheel attaching members 33 and 35 and securing the connecting members by nuts 44 and 45.

Auxiliary frame 10 is more clearly illustrated in FIGS. 1, 2, 5 and 6, wherein an upper sprocket assembly 84 is shown to include a sprocket support member 90 extending upwardly from bracket 58 to support an axle housing 91 (FIG. 7) thereon. Housing 91 encloses an axle 92 and a pair of drive sprockets 94 and 96 (FIG. 6) are respectively disposed at opposite ends of axle 92. Also, a pair of handles or peddles 97 and 99 are connected to opposite ends of axle 92. A chain 98 connects lower sprocket 56 to upper drive sprocket 96 and a second chain 100 connects lower sprocket 54 (FIG. 6) to forward drive sprocket 94. Sprockets 96, chain 98 and sprocket 56 cooperate to permit the wheelchair to be driven rearwardly. Sprockets 54, chain 100, and sprocket 94 cooperate to permit the wheelchair to be driven forwardly.

Sprocket assemblies 57 and 84 are conventional bicycle sprocket assemblies and include sprockets which are rotatable in a first direction when rotated by an external force, such as a handle, peddle, etc., and "freewheel" when the external rotating force is applied in a reverse direction. In the "freewheeling" mode, the sprockets are disengaged from their respective axles and do not rotate the axles. The upper sprocket assembly 84 is similar to the peddle sprocket assembly of a bicycle and the lower sprocket assembly 57 is similar to the rear wheel drive sprocket of a bicycle. the bicycle referred to of course uses hand brakes instead of sprocket actuated brakes.

Figure 6:
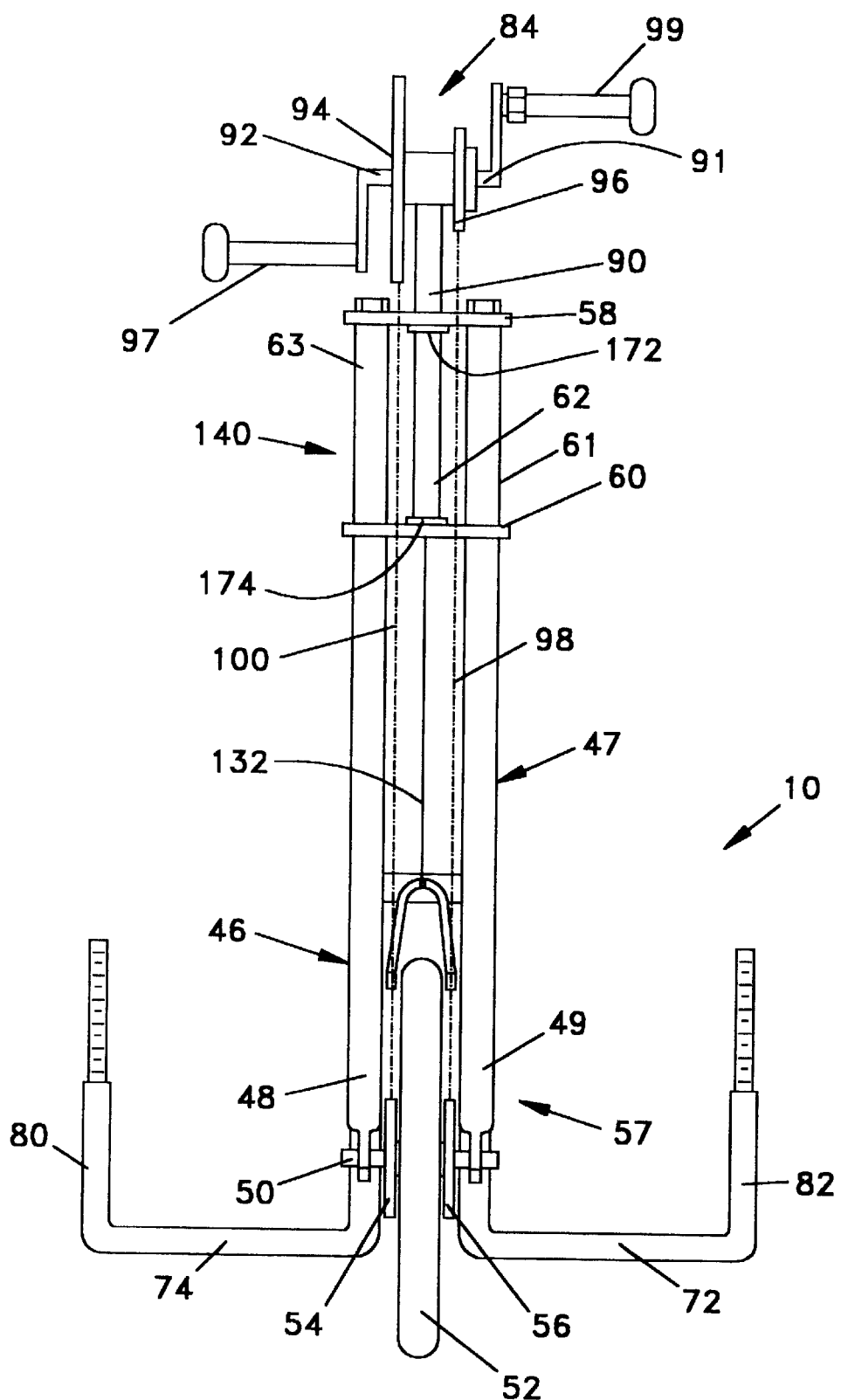
FIG. 6 is a front elevational view of the auxiliary frame of FIG. 5.

As seen in FIG. 6, sprocket 94 of upper sprocket assembly 84 is mounted on axle 91 for rotation thereof and is connected to sprocket 54 of lower sprocket assembly 57 by chain 100 to rotate together in a direction which will drive the wheelchair forwardly. Sprockets 56 and 96 are in a "freewheeling" mode when sprockets 94 and 54 are rotated in the same forward drive; however, in the "freewheeling" mode, sprockets 56 and 96 are not locked in engaged relation with axles 50 and 91 and are not affected by rotation of the axles by sprockets 94 and 54.

To drive the wheelchair in reverse, sprocket 96 is rotated in a reverse direction (counterclockwise) by peddles 97 and 99 and thereby also rotates sprocket 56 in the same direction since sprockets 96 and 56 are connected by chain 98. However, since upper drive sprocket 96 is normally in a "freewheeling" mode during rotation in the reverse direction some means must be provided to engage sprocket 96 with axle 91 when the reverse rotation is desired. This is done by a sprocket control device 104.

The sprocket control device engages and disengages drive sprocket 96 and axle 92 through handle 99 which is rigidly secured to axle 92. Control device 104 is shown in FIG. 7 to be mounted to handle 99 by screws (not shown) or by welding, if desired, and includes a spring biased rod 106 which extends outwardly to engage grooves 108 and holes 109 provided around the periphery of a shoulder 110 of sprocket 96.

As more clearly seen in FIG. 8 control device 104 includes a housing 112 having a tension spring 114 mounted therein. Rod 106 extends through the spring and out of both sides of housing 112. Rod 106 is provided with a flange 116 secured thereto and against which one end of spring 114 abuts. Housing 112 includes a lower shoulder 120 and a raised shoulder 122 and rod 106 is provided with a handle 124 at end 126 thereof which engages lower shoulder 120 when the rod is extended out of end 118 of housing 112 and into grooves 108 and holes 109 of shoulder 110 (FIGS. 8 and 9). In this position sprocket 94 is engaged with axle 92 through handle 99 and therefore rotates responsive to rotation of handle 99. Control device handle 124 engages and is retained against raised shoulder 122 when the rod is withdrawn (by handle 124) into housing 112 to retain the rod and sprocket in disengaged relation. The disengaged relation permits sprocket 96 to "freewheel" when handles 97 and 99 are rotated to move the wheelchair in a forward direction. The dot-dash lines illustrate the handle 124 as resting against raised shoulder 122 when rod 106 is withdrawn from grooves 108 of shoulder 110 and holes 109 of sprocket 96.

A brake system is utilized in the apparatus. The brake system is a conventional bicycle hand brake system which includes a lever 130 mounted on arm rest 26 or 27 and connected by a cable 132 to a brake pad assembly 134 which includes conventional brake pads mounted on opposite sides of wheel 52 for engagement and disengagement with the wheel.

FIG. 10 is an elevational view partially in section of bracket assembly 140 and illustrates the manner in which support members 46 and 47 and connecting members 65 and 67 are connected to auxiliary frame 10. As seen in FIG. 10, the upper ends of coupling members 65 and 67 are tapped to receive bolts 142 and 144 in threaded relation therein. The rod-like wheel support members 46 and 47 are shown to extend through lower bracket 60 and secured to upper bracket 58 by a bolt 146.

Figure 11:
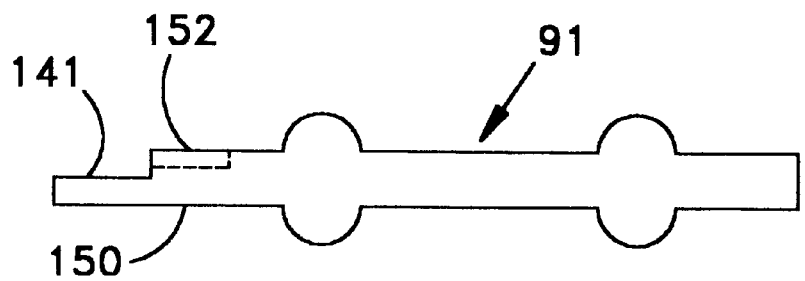
FIG. 11 is an elevational view illustrating the configuration of upper shaft or axle. The axle is shown to have a keyway therein to receive a key which extends through a slot in the sprocket to attach the sprocket to the axle.

FIG. 11 is an elevational view of the axle 91. As seen in FIG. 11, axle 91 includes a semi-circular end portion 141 and a round portion 150 which is provided with a slot or keyway 152 into which a key is inserted as described hereinbelow.

FIG. 12 is a partial sectional view illustrating the manner in which handle 99 is connected to axle 91 and in which sprocket 94 is connected to axle 91. As seen in FIG. 12, sprocket 94 is mounted on axle 91 in a position over keyway 152 and a key 154 is positioned in keyway 152 and in an internal slot or groove 156 of sprocket 94. Handle 99 includes a semi-circular opening 158 and the flat portion 160 of the opening is mated with a flat end portion 141 of axle 91. A set screw 162 secures the handle to the axle 91.

To permit ease of assembly of the chains to the sprockets, an adjustable mechanism 163 is provided at the lower forked ends 48 and 49 of elongated rod-like support members 46 and 47. As seen in FIG. 13, adjustable mechanism 162 includes a member 163 having a threaded body portion 165 and an upper eyelet portion 166 provided with an opening 167 to fit over the ends of lower axle 50. Member 163 is secured to the ends of axle 50 by a nut 169. The distal ends of support members 46 and 47 are forked and extend into a cup-like member 168 which is slidably mounted on body portion 165. A nut 169 is provided on the distal end of member 162 and is movable there along. With the forked end of members 46 and 47 straddling axle 50 and the distal ends thereof resting in cup-shaped member 168, the nut 169 is threadedly moved along the threaded body portion 165 for engagement with cup-shaped member 168 to move the cup-shaped member and thus the elongated rod-like members 46 and 47 relative to axle 50. Body portion 165 includes a diametrically enlarged portion 171 which fits between the forks of support members 46 and 47. Such movement of cup-shaped member 168 adjusts the belt tension and once the desired tension is achieved, the nut 166 is tightened to secure the axle 50 to member 46.

It is to be understood that with the wheelchair mainframe and the auxiliary frame in their assembled position as shown in FIG. 2, the wheelchair user may pivot the wheel 52 to turn the wheel in different (right or left) directions. This is accomplished by pushing or pulling on handle 99 which rotates member 90 and the brackets 58 and 60 (and, therefore, elongated legs 47 and 47) around rod-like support member 62 which is secured to coupling members 65 and 67. Bearings 172 and 174 are provided on member 52 between brackets 58 and 60 and support member 52 to aid in the rotation of member 62 in the brackets.

It is to be understood that while a specific embodiment of he invention has been disclosed herein, various modifications may be resorted to that is within the spirit and scope of the appended claims.

I claim:

1. An auxiliary frame with propulsion and steering means in combination with a wheelchair for forming a composite vehicle, said wheelchair having a mainframe including a forward portion provided with a pair of front wheel attaching members thereon having openings for supporting a pair of small front wheels therein, comprising:

coupling means for coupling said auxiliary frame to said wheelchair, including a pair of wheelchair attaching members extending horizontally from said auxiliary frame, said attaching members having a pair of vertically upstanding externally threaded end sections disposed for insertion in said openings of said front wheel support members of said mainframe of said wheelchair subsequent to removal of said front wheels from said front wheel supporting members, said auxiliary frame including a pair of vertically extending members having upper and lower ends and, a pair of tubular members secured to said vertically extending members, and said attaching means includes a pair of members each having an elongated vertical section for secured relation in said tubular members, said horizontally extending sections and said vertically upstanding threaded end, and nut means for securing said vertically upstanding threaded ends in said front wheel attaching members;

a steerable wheel mounted on said auxiliary frame;

manually operable propulsion means mounted on said auxiliary frame for rotating said steerable wheel to provide propulsion to said wheelchair, said propulsion means including a first manually operable drive means for propelling said wheelchair in a first forward direction and a second manually operable drive means for propelling said wheelchair in a second rearward direction, said first drive means including a first sprocket assembly including a first axle having a first sprocket at one end thereof and a second sprocket at the second end thereof, said first sprocket assembly mounted on said upper end of said vertically extending members of said auxiliary frame and having handle means secured to said axle for rotation thereof;

said second drive means including a second sprocket assembly including a second axle having a third sprocket at one end thereof and a fourth sprocket at the second end thereof, said second sprocket assembly mounted on said lower end of said vertically extending members;

a first chain connecting said first sprocket and said third sprocket further defining said first drive means;

a second chain connecting said second sprocket and said fourth sprocket further defining said second drive means; and said first and third sprockets cooperate to drive said wheelchair in the forward direction and said second and said fourth sprockets cooperate to drive said wheelchair in the rear direction; and control means for selectively engaging and disengaging said first and second drive means to permit forward or rearward movement of said wheelchair.

2. Apparatus as in claim 1 wherein said control means includes a housing having a spring biased rod therein and means for selectively positioning said rod in an extended position and a retracted position, wherein when in said extended position said rod couples said axle with said second sprocket and when in said retracted position said axle is decoupled from said second sprocket.

3. Apparatus as in claim 1 wherein said control means includes a housing having a spring biased rod therein and means for selectively positioning said rod in an extended position and a retracted positions wherein when in said extended position said rod couples said axle with said second sprocket and when in said retracted position said axle is decoupled from said second sprocket.

4. An auxiliary frame in combination with a wheelchair for forming a composite vehicle comprising:

a steerable wheel mounted on said auxiliary frame;

propulsion means mounted on said auxiliary frame for rotating said steerable wheel to provide propulsion to said wheelchair, said propulsion means including first drive means mounted on said auxiliary frame for moving said wheelchair in a forward direction, and, second drive means mounted on said auxiliary frame for moving said wheelchair in a rearward direction, and control means for selective engagement of said first and second drive means to effect the forward or rearward movement of said first and second drive means;

coupling means for coupling the auxiliary frame to said wheelchair, said wheelchair having a mainframe including a pair of vertical members having openings, said coupling means including a pair of coupling members extending rearwardly from said auxiliary frame and having upstanding members at the distal ends thereof for secured relation in said openings of said vertical members subsequent to removal of a pair of front wheels from said openings of said mainframe.

* * * * *